United States Patent
Nogami et al.

(10) Patent No.: US 8,094,739 B2
(45) Date of Patent: Jan. 10, 2012

(54) MODULATION PARAMETER SELECTING METHOD, MODULATION PARAMETER SELECTING APPARATUS, AND COMMUNICATION APPARATUS

(75) Inventors: Toshizo Nogami, Chiba (JP); Takashi Onodera, Yotsukaido (JP)

(73) Assignee: Sharp Kabushiki Kaisha, Osaka (JP)

( * ) Notice: Subject to any disclaimer, the term of this patent is extended or adjusted under 35 U.S.C. 154(b) by 813 days.

(21) Appl. No.: 12/161,660

(22) PCT Filed: Jan. 16, 2007

(86) PCT No.: PCT/JP2007/050531
§ 371 (c)(1),
(2), (4) Date: Jul. 21, 2008

(87) PCT Pub. No.: WO2007/088723
PCT Pub. Date: Aug. 9, 2007

(65) Prior Publication Data
US 2010/0220807 A1    Sep. 2, 2010

(30) Foreign Application Priority Data
Jan. 31, 2006    (JP) .................................. 2006-022454

(51) Int. Cl.
H04L 27/28    (2006.01)
(52) U.S. Cl. ....................................................... 375/260
(58) Field of Classification Search .................. 375/260, 375/267
See application file for complete search history.

(56) References Cited

U.S. PATENT DOCUMENTS
2003/0137950 A1*  7/2003  Kim et al. ...................... 370/318
2006/0159120 A1*  7/2006  Klm .............................. 370/465
2006/0234643 A1   10/2006  Kikuchi FOREIGN PATENT DOCUMENTS
JP      2005-252834 A      9/2005
WO  WO-2005/002253 A1    1/2005

OTHER PUBLICATIONS

Ericsson et al., 3GPP TSG RAN WG1 #42bis R1-051149, Oct. 2005, pp. 1-10.
3GPP, TSG RAN WG1 #42 on LTE, R1-050854, Sep. 2005, pp. 1-7.
Toshiba, Adaptive Modulation and Coding for Evolved UTRA Downlink, 3GPP TSG-RAN WG1 #42bisR1-051055, San Diego, CA, Oct. 2005, pp. 2-4.

* cited by examiner

*Primary Examiner* — Don N Vo
(74) *Attorney, Agent, or Firm* — Birch, Stewart, Kolasch & Birch, LLP

(57) ABSTRACT

A modulation parameter selecting method in a system including, as a scheduler portion, a temporal coding rate determining portion that determines a coding rate temporarily, a temporal modulation rate determining portion for selecting a modulation method that satisfies required quality and has a maximum transmission rate in each channel, under the temporarily determined coding rate, and a transmission rate computing portion that calculates a transmission rate from the coding rate determined at the temporal coding rate determining portion and the modulation method in each of the channels selected at the temporal modulation method determining portion, in which processing from the temporal coding rate determining portion to the transmission rate computing portion is performed repeatedly with respect to selectable coding rates and a coding rate with a maximum transmission rate and a modulation method in each of the channels are determined.

9 Claims, 16 Drawing Sheets

| CHANNEL NUMBER | AVERAGE RECEPTION CNR VALUE |
|---|---|
| CHANNEL 1 | 6 |
| CHANNEL 2 | 10 |
| CHANNEL 3 | 5 |
| CHANNEL 4 | -1 |
| CHANNEL 5 | 4 |
| CHANNEL 6 | 8 |
| CHANNEL 7 | 1 |

QPSK, R=1/3

Conventional Art

MODULATION PARAMETER SELECTING METHOD, MODULATION PARAMETER SELECTING APPARATUS, AND COMMUNICATION APPARATUS

FIELD OF THE INVENTION

The present invention relates to a modulation parameter selecting method and the like including a modulation method and a coding rate, in a system which allows that, with respect to data allocated over a plurality of channels by performing data transmission using the plurality of channels from a first communication apparatus to a second communication apparatus, a coding rate is same and only a modulation method is different in the plurality of channels to which the data has been allocated.

DESCRIPTION OF THE RELATED ART

Recently, it has been required to increase speed in a wireless communication system, and as one of methods capable of realizing a speed up and a large capacity, a multicarrier transmission method for performing communication by putting information on a plurality of carrier waves attracts attentions. An OFDM (Orthogonal Frequency Division Multiplex) method, that is one of multicarrier transmission methods, is one of the most prevailing modulation methods for a broadband wireless communication system, since the space between subcarriers orthogonal to each other can be narrowed, and therefore efficiency in the frequency utilization is high and the resistance to a multi-path phasing is high by a guard interval added at the head of a symbol sequence.

However, a method of giving a modulation parameter for each subcarrier, or for each group including a plurality of subcarriers, requires a notification of a modulation parameter between a transmitter and a receiver for each of the subcarriers or each of the groups. Since the amount of information to be notified also increases as the number of subcarriers or the number of groups increases, there is a problem that a ratio of control information to a limited communication capacity becomes high and transmission efficiency is deteriorated.

As a method for solving the problem, in the 3GPP (The 3rd Generation Partnership Project), as shown in FIG. 15, a system in which a coding rate is made to be common in a plurality of channels allocated to a certain terminal and a modulation method is made different for each of the channels so that the amount of information required for the notification of a modulation parameter is suppressed, is proposed (for example, refer to the Non-Patent Document 1).

Transmission data to a certain user is channel-coded collectively (2001) and subjected to rate matching processing (2002). That is, the coding rate is constant, independent of channels. Thereafter, the coded transmission data is allocated to each of the channels (2003), and modulated by individual modulation method for each of the channels (2004).

For example, in the case of a transmission path (2101) as shown in FIG. 16, as a combination of a modulation method and a coding rate in each channel, the coding rate of ⅓ is selected in all of the channels and the modulation method is selected from QPSK, 16QAM, and 64QAM for each of the channels (2102).

Non-Patent Document 1: "Adaptive Modulation and Channel Coding Rate Control for Frequency Domain Scheduling in Evolved UTRA Downlink", 3GPP, TSG RAN WG1 #42 on LTE, R1-050854, September 2005

SUMMARY OF THE INVENTION

Problems to be Solved by the Invention

However, in the system proposed in the above well-known document, since there is a restriction that a coding rate is made to be common, it is difficult to apply a conventionally used method of selecting a modulation parameter as it is.

Further, in the above well-known document, although a communication system in which a coding rate is made to be common in a plurality of channels allocated to a certain terminal and a modulation method is made different for each of the channels so that the amount of information required for the notification of a modulation parameter is suppressed, is proposed, an investigation related to a method of selecting a modulation parameter in the system is not made.

In view of the above mentioned problems, the present invention has an object to realize a modulation parameter selecting method and a modulation parameter selecting apparatus, that can realize a high transmission rate efficiently in a system that a coding rate is made to be common in a plurality of channels allocated to a predetermined terminal and a modulation method is made different for each of the channels.

Means to Solve the Problems

In order to solve the above problems, a modulation parameter selecting method of a first aspect of the present invention, that is related to a modulation method and a coding rate in a system which allows, with respect to data allocated over a plurality of channels by performing data transmission using the plurality of channels from a first communication apparatus to a second communication apparatus, that the coding rate is same and only the modulation method is different in the plurality of channels to which the data has been allocated, includes: a first step of selecting and temporarily determining one coding rate from predetermined selectable coding rates; a second step of selecting a modulation method that satisfies required quality and has a predetermined transmission rate in each of the channels, under the temporarily determined coding rate; a third step of calculating a transmission rate from the coding rate temporarily determined at the first step and the modulation method in each of the channels selected at the second step; and a fourth step of repeating from the first step to the third step with respect to other selectable coding rates to determine the coding rate that has the predetermined transmission rate and the modulation method in each of the channels.

Further, a second aspect of the present invention according to the modulation parameter selecting method of the first aspect of the present invention, further includes, before the second step, a fifth step of ordering each of the channels based on reception quality, and a sixth step of ordering selectable modulation methods by modulation multi-value number, and is characterized in that the modulation method is selected at the second step in accordance with an order of the channels determined at the fifth step and an order of the modulation methods determined at the sixth step.

Further, a third aspect of the present invention according to the modulation parameter selecting method of the first or second aspect of the present invention, further includes, before the first step, a seventh step of changing the selectable coding rate from the reception quality in a channel whose predetermined conditions include the reception quality, and is characterized in that the temporal coding rate is determined at the first step from the selectable coding rates determined at the seventh step.

Further, a fourth aspect of the present invention according to the modulation parameter selecting method of the first or second aspect of the present invention, further includes, before the first step, an eighth step of determining a selectable modulation method with a minimum transmission rate temporarily in a channel that has a most inferior reception quality, a ninth step of determining a coding rate in which the channel satisfies the required quality and the transmission rate becomes maximum, under the modulation method temporarily determined at the eighth step, and a tenth step of changing the selectable coding rates based on the coding rate determined at the ninth step, and is characterized in that the temporal coding rate is determined at the first step from the selectable coding rates determined at the tenth step.

Further, a fifth aspect of the present invention according to the modulation parameter selecting method of any one of the first to fourth aspects of the present invention, further includes, before the first step, an eighth step of determining a selectable modulation method with a minimum transmission rate temporarily in a channel that has a most inferior reception quality in the channels that satisfy predetermined reception quality, a ninth step of determining a coding rate in which the channel satisfies the required quality and the transmission rate becomes maximum, under the modulation method temporarily determined at the eighth step, and a tenth step changing the selectable coding rates based on the coding rate determined at the ninth step, and is characterized in that the temporal coding rate is determined at the first step from the selectable coding rates determined at the tenth step, and a channel that does not satisfy the predetermined reception quality is determined as a carrier hole.

A sixth aspect of the present invention that is a modulation parameter selecting apparatus related to a modulation method and a coding rate in a system which allows, with respect to data allocated over a plurality of channels by performing data transmission using the plurality of channels from a first communication apparatus to a second communication apparatus, that the coding rate is same and only the modulation method is different in the plurality of channels to which the data has been allocated, includes a temporal coding rate determining portion that selects and temporarily determines one coding rate from predetermined selectable coding rates; a temporal modulation method determining portion that selects a modulation method that satisfies required quality and has a predetermined transmission rate in each of the channels, under the temporarily determined coding rate; and a transmission rate computing portion that calculates a transmission rate from the coding rate temporarily determined at the temporal coding rate determining portion and the modulation method in each of the channels selected at the temporal modulation method determining portion, and is characterized in that, processing from the temporal coding rate determining portion to the transmission rate computing portion is performed repeatedly with respect to other selectable coding rates, to determine the coding rate that has the predetermined transmission rate and the modulation method in each of the channels.

A seventh aspect of the present invention according to the modulation parameter selecting apparatus of the sixth aspect of the present invention, further includes, a channel ordering portion that orders each of the channels based on reception quality, and a modulation method ordering portion that orders selectable modulation methods by modulation multi-value number, and is characterized in that, the modulation method is selected at the temporal modulation method determining portion in accordance with an order of the channels determined at the channel ordering portion and an order of the modulation methods determined at the modulation method ordering portion.

Further, an eighth aspect of the present invention according to the modulation parameter selecting apparatus of the sixth or seventh aspect of the present invention, further includes, a coding rate computing portion that changes the selectable coding rate from the reception quality in a channel whose predetermined conditions include the reception quality, and is characterized in that, the temporal coding rate is determined at the temporal coding rate determining portion from the selectable coding rates determined at the coding rate computing portion.

Further, a ninth aspect of the present invention according to the modulation parameter selecting apparatus of the sixth or seventh aspect of the present invention, further includes, a maximum coding rate computing portion that changes the selectable coding rates based on a coding rate in which a channel satisfies the required quality and a transmission rate is maximum, under the selectable modulation method that has a minimum transmission rate in the channel that has most inferior reception quality, and is characterized in that, the temporal coding rate is determined at the temporal coding rate determining portion from the selectable coding rates changed at the maximum coding rate computing portion.

Further, a tenth aspect of the present invention according to the modulation parameter selecting apparatus of the sixth or seventh aspect of the present invention, further includes, a maximum coding rate computing portion that changes the selectable coding rates based on a coding rate in which a channel satisfies the required quality and a transmission rate is maximum, under the selectable modulation method that has a minimum transmission rate in the channel that has most inferior reception quality in the channels that satisfy predetermined reception quality, and is characterized in that, the temporal coding rate is determined at the temporal coding rate determining portion from the selectable coding rates changed at the maximum coding rate computing portion, and a channel that does not satisfy the predetermined reception quality is determined as a carrier hole.

Further, an eleventh aspect of the present invention of a communication apparatus includes the modulation parameter selecting apparatus of any one of the sixth to tenth aspects of the present invention, and is characterized in that, information related to a modulation parameter selected by the modulation parameter selecting apparatus is transmitted to a communication partner.

Effect of the Invention

By applying the present invention, in a plurality of allocated channels, a coding rate that satisfies required quality and has a predetermined transmission rate and a modulation method of each channel are determined. For example, a coding rate that has a maximum transmission rate as the predetermined transmission rate and a coding rate of each of the channels are determined, and thereby a communication terminal can perform communication efficiently.

Further, reception quality and modulation multi-value number in each channel are ordered beforehand and thereby the computing amount required for the ordering is increased, but in all of the allocated channels, it is possible to suppress the computing amount at the time of selecting the coding rate that has the predetermined transmission rate under the conditions that the required quality is satisfied and the modulation method in each of the channels. Accordingly, it is possible to select the coding rate and the modulation method of each of the channels efficiently.

Figure 1:
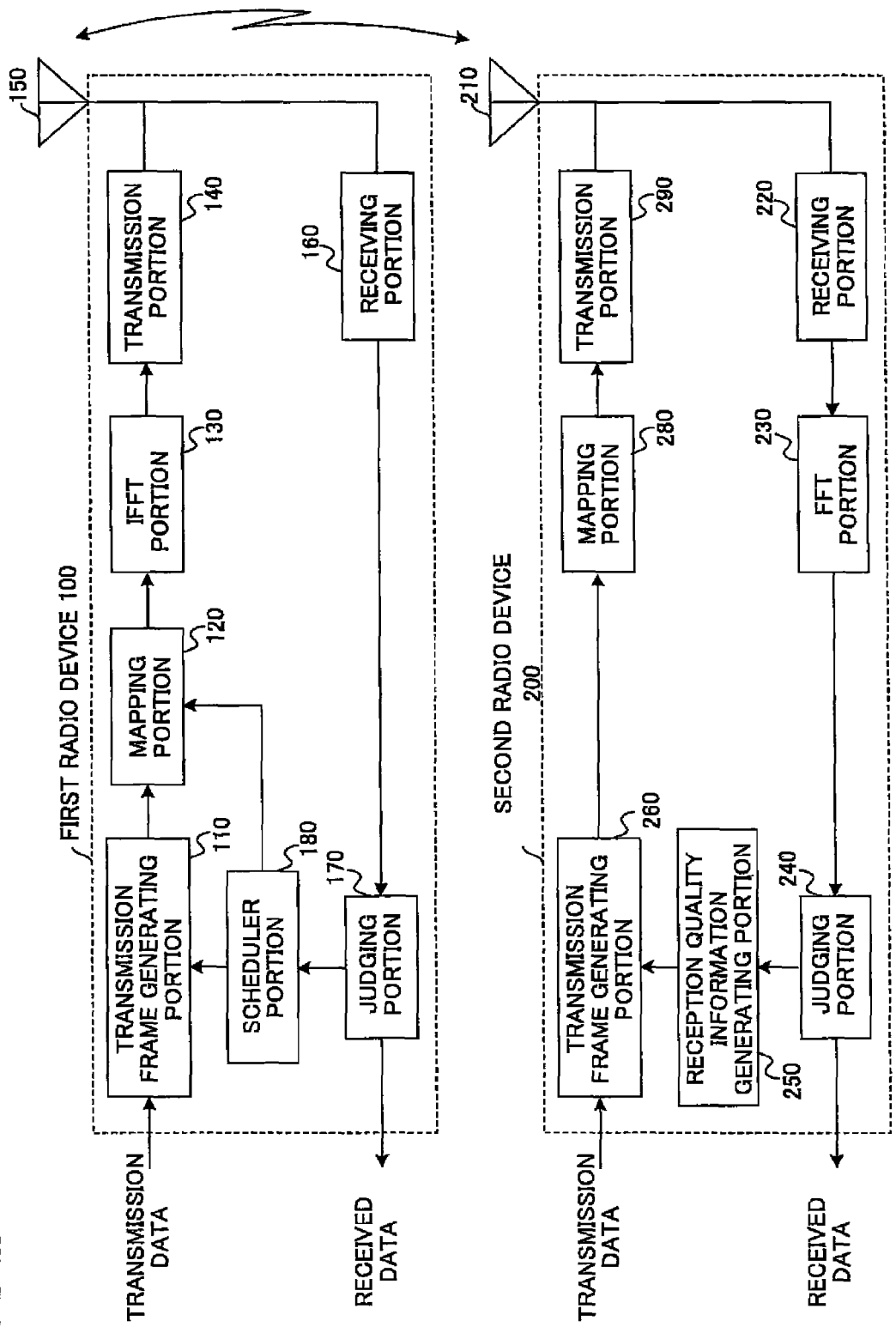
FIG. 1 is a view illustrating a configuration of a radio device in a first embodiment.

EXPLANATIONS OF NUMERALS 100 first radio device
110 transmission frame generating portion
120 mapping portion
130 IFFT portion
140 transmission portion
150 antenna
160 receiving portion
170 judging portion
180 scheduler portion
181 allocation determining portion
182 MCS selecting portion
1821 temporal coding rate determining portion
1822 temporal modulation method determining portion
1823 transmission rate computing portion
1824 transmission rate judging portion
1825 channel ordering portion
1826 modulation method ordering portion
1827 maximum coding rate computing
200 second radio device
210 antenna
220 receiving portion
230 FFT portion
240 judging portion
250 reception quality information generating portion
251 reception quality information generating portion
260 transmission frame generating portion
280 mapping portion
290 transmission portion

DESCRIPTION OF PREFERRED EMBODIMENTS

Figure 15:
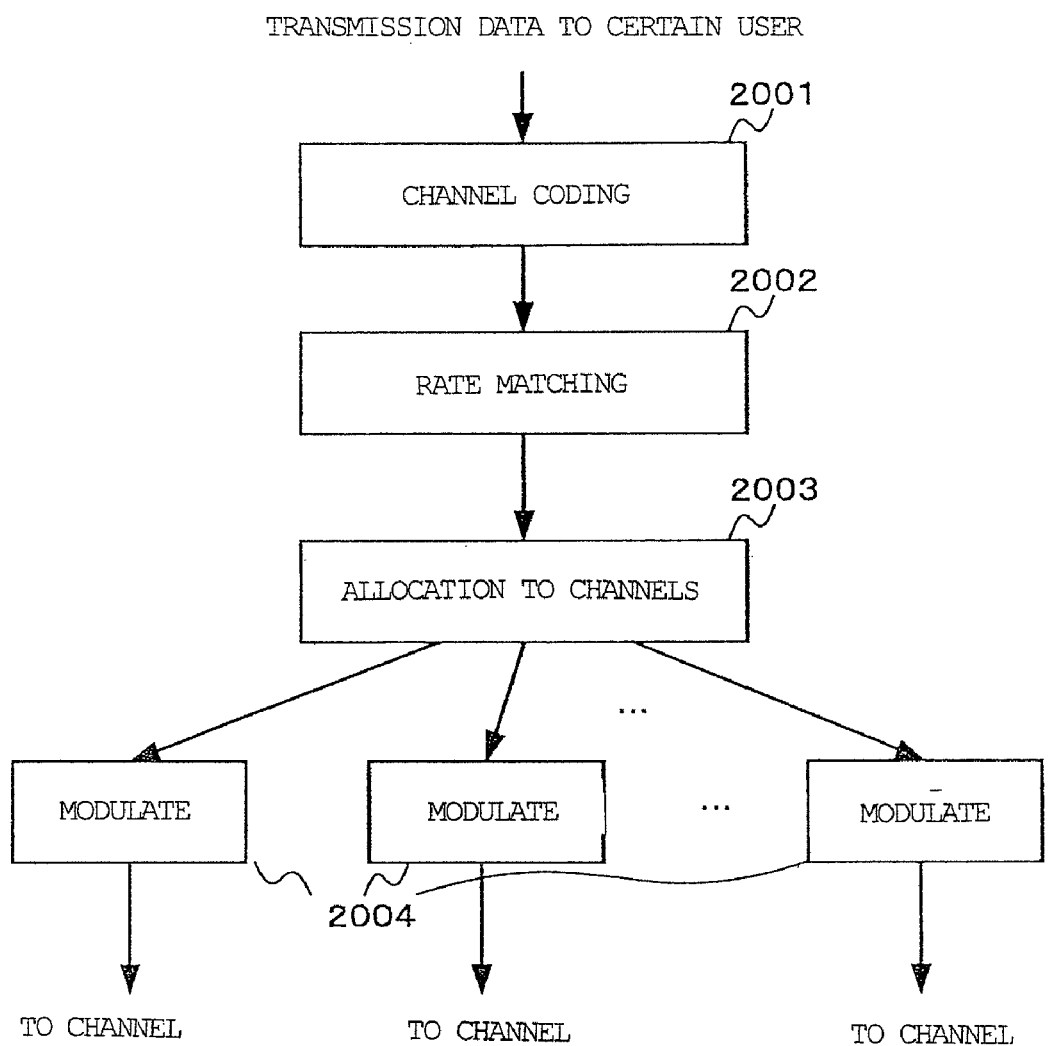
FIG. 15 is a view illustrating a conventional example.
Figure 16:
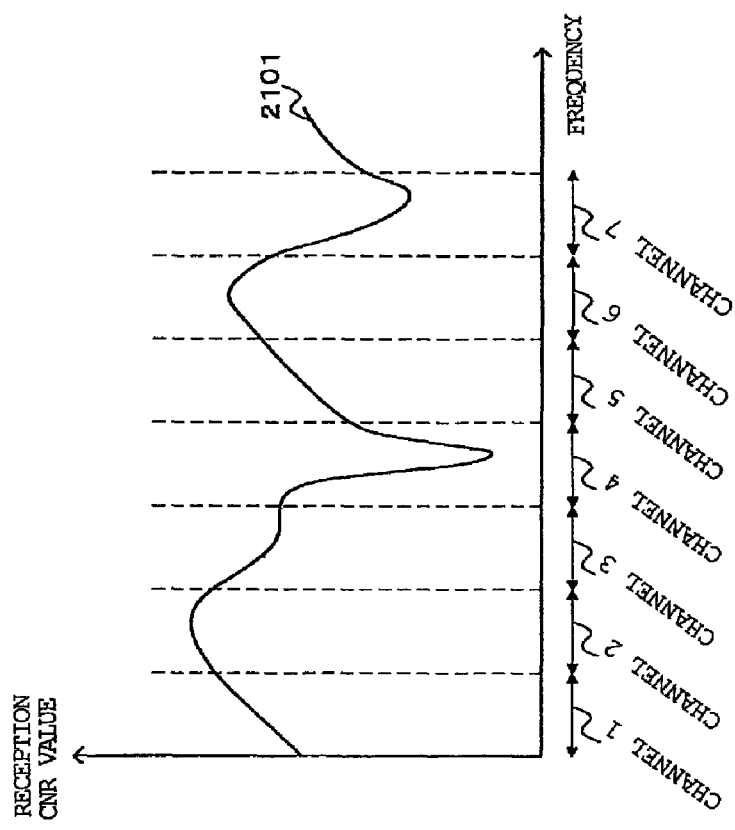
FIG. 16 is a view illustrating a conventional example.

The present invention relates to an MCS (Modulation and channel Coding Scheme) selecting method when a plurality of channels are allocated for one radio device. Moreover, a system which allows that a coding rate is same and only a modulation method is different in the plurality of channels, for example as shown in FIG. 15, is assumed.

The First Embodiment

In the present embodiment, a case that an MCS of transmission data from a first radio device 100 to a second radio device 200 is selected by the first radio device 100 using the present invention, will be described. An example of a block configuration of a system according to the present embodiment is shown in FIG. 1.

In FIG. 1, although one first radio device 100 and one second radio device 200 are shown, the first radio device 100 and a plurality of second radio devices 200 perform communication using a plurality of channels.

Here, the first radio device 100 is configured so as to comprise a transmission frame generating portion 110, a mapping portion 120, an IFFT (Inverse Fast Fourier Transformation) portion 130, a transmission portion 140, an antenna 150, a receiving portion 160, a judging portion 170, and a scheduler portion 180. Further, the second radio device 200 is configured so as to comprise an antenna 210, a receiving portion 220, an FFT (Fast Fourier Transformation) portion 230, a judging portion 240, a reception quality information generating portion 250, a transmission frame generating portion 260, a mapping portion 280, and a transmission portion 290.

The transmission frame generating portion 110 performs coding and modulation processing based on scheduling control information notified from the scheduler portion 180 and MCS information. Moreover, in a generated symbol sequence, control information (and pilot signal) for notifying the scheduling control information and the MCS information to the second radio device 200 is generated to multiplex to a data symbol. The generated transmission frame is output to the mapping portion 120.

The mapping portion 120 is a functional portion for mapping the modulation symbol sequence input from the transmission frame generating portion 110 in accordance with the scheduling control information notified from the scheduler portion 180. The modulation symbol sequence thus mapped is output to the IFFT portion 130 and an OFDM symbol sequence is generated by IFFT processing.

An OFDM frame generated at the FFT portion 130 is transmitted from the antenna 150 to the second radio device 200 through the transmission portion 140.

In the second radio device 200, the OFDM symbol sequence received at the receiving portion 220 through the antenna 210 is output to the FFT portion 230. The FFT portion 230 executes FFT processing, and thereby a signal of the OFDM symbol sequence is converted into a signal of the modulation symbol sequence, and output to the judging portion 240.

The judging portion 240 is a function portion for demodulating and decoding the input modulation symbol sequence to extract received data. At this time, judging processing is performed in accordance with the scheduling control information and the MCS information notified from the first radio device 100. In addition, the pilot signal that has been multiplexed to a frame in advance is output to the reception quality information generating portion 250. Note that, when performing an interference power measurement in the judgment feedback type, a data sequence and judgment result are output to the reception quality information generating portion 250.

Figure 2:
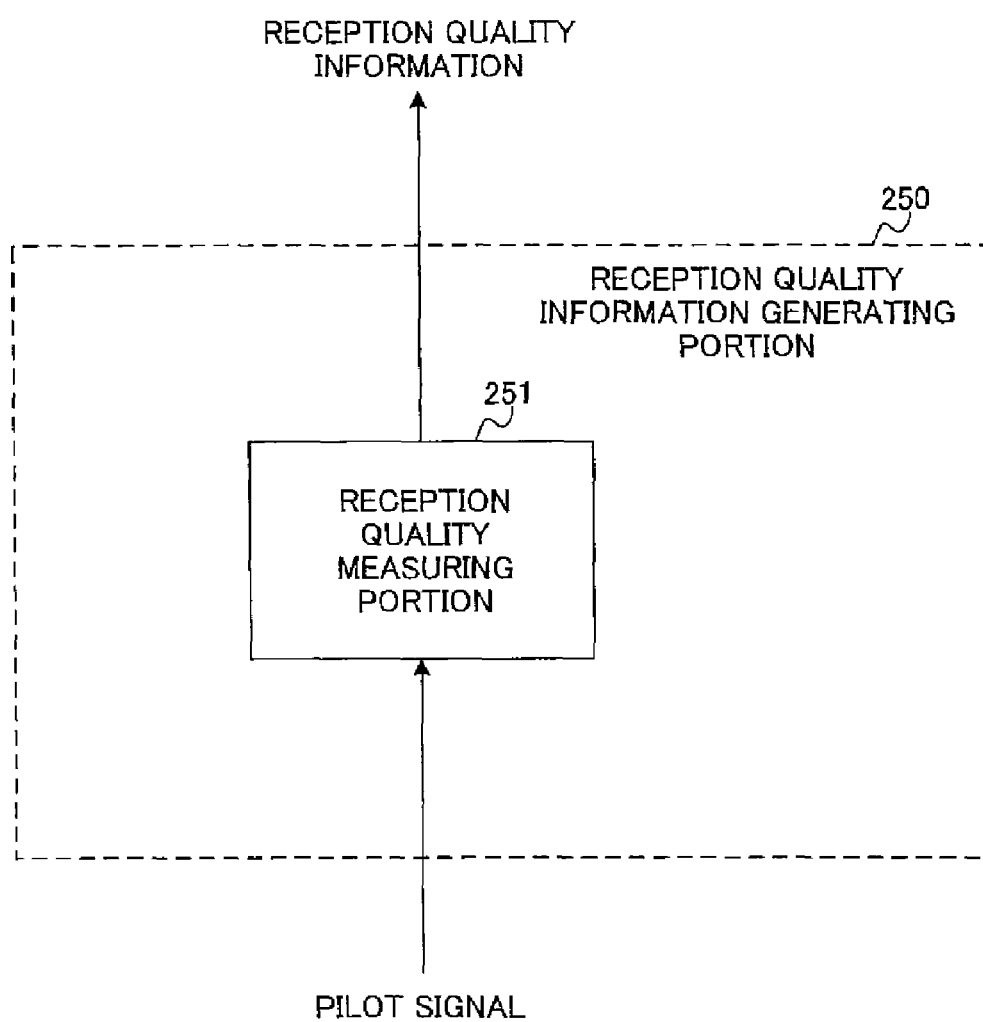
FIG. 2 is a view illustrating a configuration of a reception quality information generating portion in the first embodiment.

A block configuration of the reception quality information generating portion 250 is shown in FIG. 2. The reception quality information generating portion 250 includes a reception quality measuring portion 251. The reception quality measuring portion 251 measures reception quality from the pilot signal input from the judging portion 240 to generate reception quality information for outputting the reception quality to the first radio device 100. The generated reception quality information is output to the transmission frame portion 260, and transmission frame is generated with transmission data.

The transmission frame portion 260 generates a transmission frame from the input reception quality information to output to the mapping portion 280. Then, the mapping portion 280 performs mapping to transmit from the antenna 210 to the first radio device 100 through the transmission portion 290.

In the first radio device 100, a signal received from the antenna 150 is input to the judging portion 170 through the receiving portion 160. The judging portion 170 extracts reception data from the input reception signal, separates the reception quality information that has been multiplexed to a frame in advance, and outputs the separated reception quality information to the scheduler portion 180.

The scheduler portion 180 is a functional portion for performing scheduling of transmission data based on reception quality information informed from the second radio device 200. Moreover, processing for determining a modulation method and a coding rate of the transmission data is executed based on the reception quality information.

Figure 3:
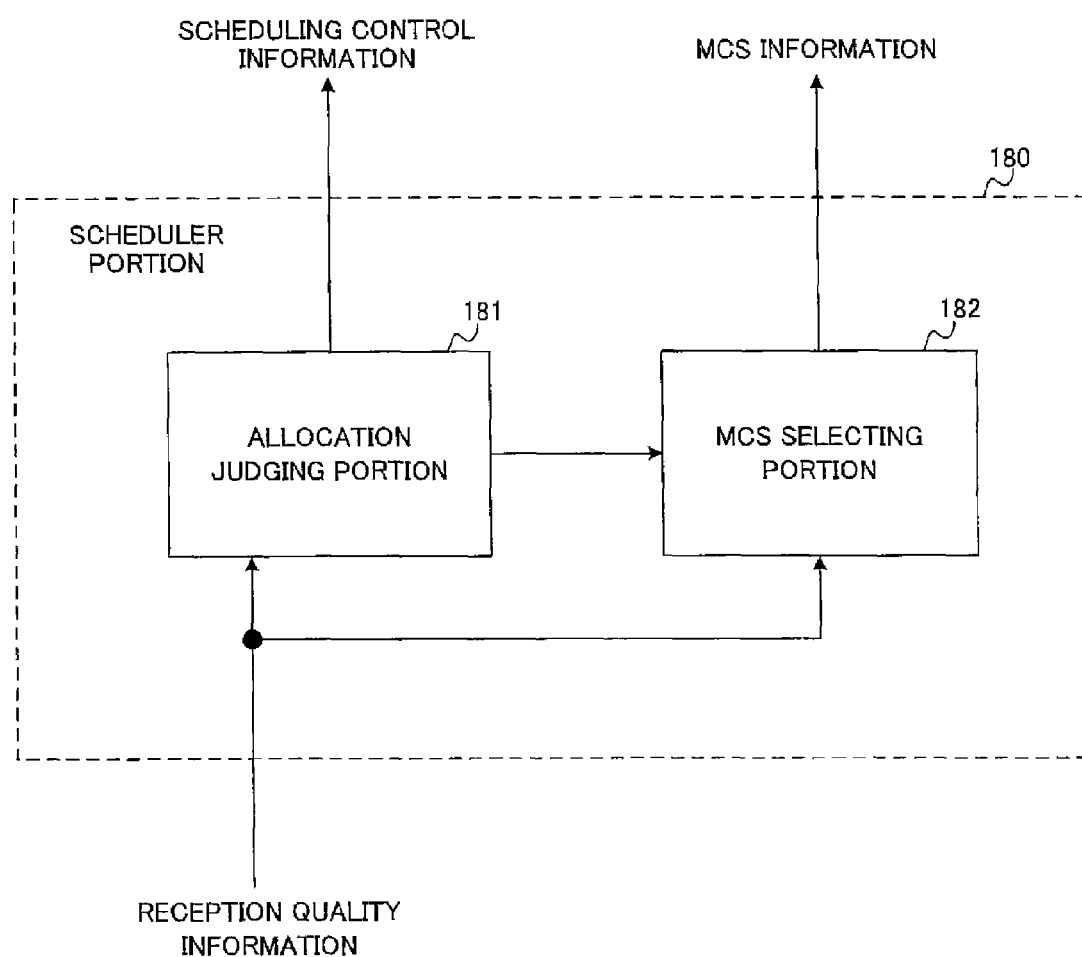
FIG. 3 is a view illustrating a configuration of a scheduler portion in the first embodiment.

Here, a block configuration of the scheduler portion 180 is shown in FIG. 3. The scheduler portion 180 is configured so as to comprise an allocation judging portion 181 and an MCS selecting portion 182. The reception quality information input from the judging portion 170 is firstly output to the allocation determining portion 181.

The allocation determining portion 181 compares reception quality information notified from the plurality of second radio devices 200 in each of channel, and allocates each of the channels to transmission data to be transmitted to the second radio devices 200 that has excellent reception quality. Information that shows which transmission data to the second radio devices 200 is allocated to each of the channels, is notified to the transmission frame generating portion 110 and the mapping portion 120 as scheduling information. In addition, the scheduling information is also output to the MCS selecting portion 182.

In the MCS selecting portion 182, an MCS at the time of modulating and demodulating each of the transmission data is determined from the scheduling information showing that to which channel the transmission data to be transmitted to each of the second radio devices 200 is allocated and the reception quality information in the channels informed from each of the second radio devices 200, so as to notify MCS information to the transmission frame generating portion 110.

Figure 4:
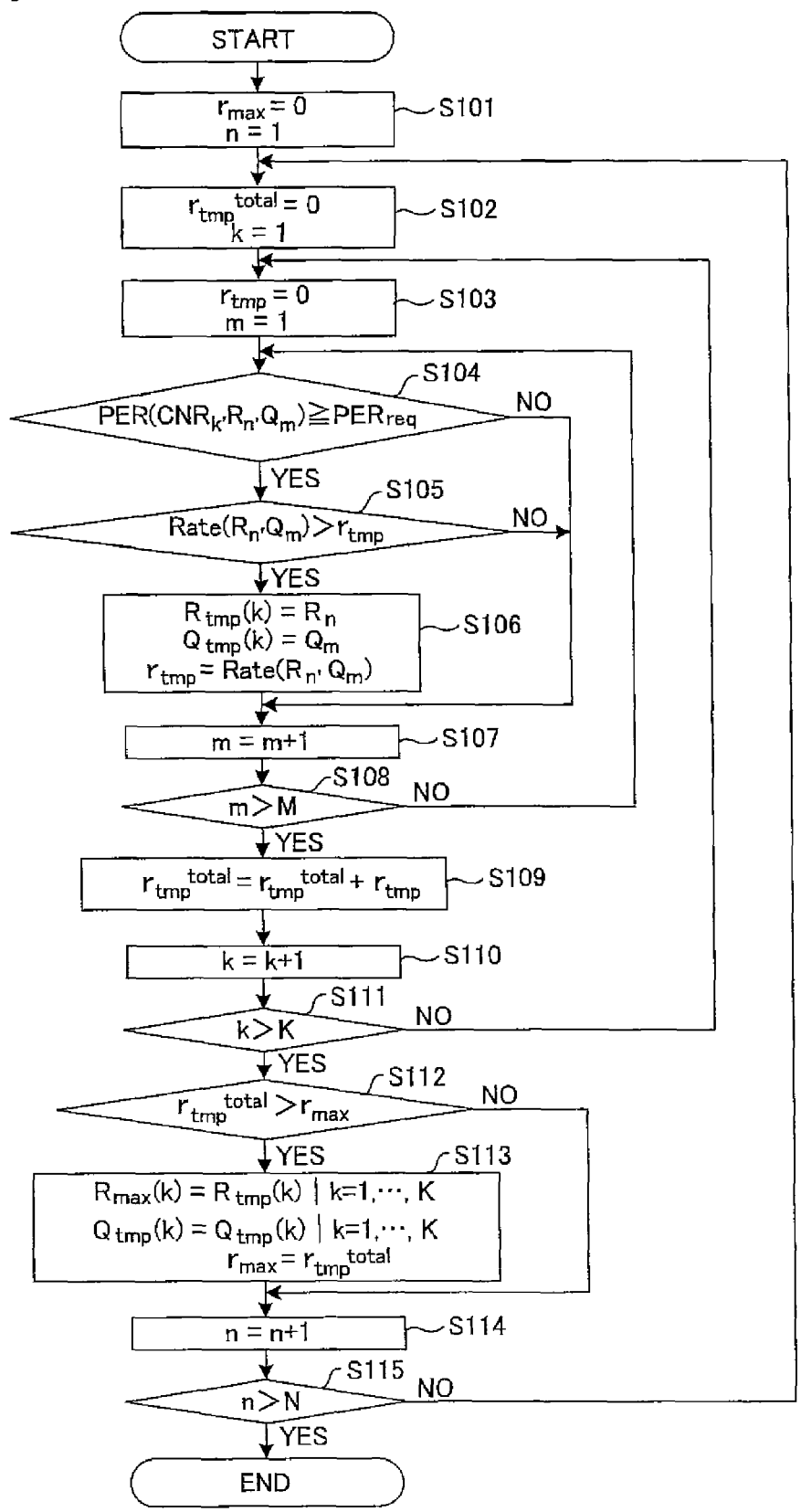
FIG. 4 is a view illustrating a processing flow of an MCS selecting portion in the first embodiment.

Subsequently, a processing flow of the MCS selecting portion 182 according to the present embodiment will be shown in FIG. 4 as an example. The MCS selecting portion 182 investigates a modulation method in which each of the channels satisfies a required PER (Packet Error Rate) in each coding rate, and selects a combination of an MCS so that a transmission rate in all of the allocated channels becomes a predetermined transmission rate. In this embodiment, description is made according to an example wherein a maximum modulation method in which each of the channels satisfies a required PER is investigated, and combination of an MCS wherein the transmission rate is the highest is selected.

Note that, $CNR_k$, $R_n$, and $Q_m$ indicate a CNR (Carrier-to-Noise power Ratio) measurement value (reception quality informed from the second radio device 200) in the k-th channel, an n-th coding rate, and an m-th modulation multi-value number (in bit unit), respectively. Each of K, N, and M indicates a channel number, a kind of a coding rate, and a kind of a modulation method, respectively, and each of k, n, and m indicates a counter of a channel number, a coding rate number, and a modulation method number, respectively. The constant $PER_{req}$ indicates a required PER, and each of a function $PER(CNR_k, R_n, Q_m)$ and a $Rate(R_n, Q_m)$ indicates PER when the CNR applies Rn and Qm as the MCS under an environment of $CNR_k$, and a transmission rate per one channel when Rn and $Q_m$ are applied.

First, a variable $r_{max}$ showing a maximum value of transmission rates in all of the allocated channels and a counter n, a variable $r_{tmp}^{total}$ showing a maximum value of transmission rates in all of the allocated channels with respect to a subject coding rate and a counter k, and $r_{tmp}$ showing a maximum value of transmission rates in the subject channel with respect to a subject coding rate and a counter m, are initialized (step S101 to step S103).

Next, the PER when $R_n$ and $Q_m$ are applied to the k-th channel as the MCS is calculated to judge whether the PER satisfies the required value $PER_{req}$ (step S104). When the required value is satisfied (S104; Yes), a transmission rate when $R_n$ and $Q_m$ are applied is calculated to compare with $r_{tmp}$ (step S105). When the transmission rate is larger than $r_{tmp}$ (S105; Yes), $R_{tmp}(k)$ and $Q_{tmp}(k)$, and the transmission rate $r_{tmp}$, which is a combination of the MCS in which the transmission rate of the subject channel with respect to the subject coding rate becomes maximum, is updated to $R_n$ and $Q_m$, and the Rate $(R_n, Q_m)$ (step S106) to increment the counter m (step S107). On the other hand, when the PER does not satisfy the required value at step S104 (step S104; No), or when the transmission rate is not maximum value at step S105 (step S105; No), moving to step S107 without passing through step S106. Then, step S104 to step S107 are repeated until the computing is finished in all of the modulation methods (until m becomes larger than M) (step S108).

Subsequently, the maximum transmission rate of each of the channels is added in the subject coding rate (step S109 to step S111), so that the maximum transmission rate $r_{tmp}^{total}$ in the subject coding rate is calculated to compare with $r_{max}$ (step S112). When the maximum transmission rate in the subject coding rate is larger than $r_{max}$ (step S112; Yes), $R_{max}(k)$ and $Q_{max}(k)$, and the transmission rate $r_{max}$, which is a combination of the MCS with the maximum transmission rate, is updated to $R_{tmp}(k)$ and $Q_{tmp}(k)$, and $r_{tmp}^{total}$ (step S113), to increment the counter n (step S114). When the maximum transmission rate in the subject coding rate is smaller than $r_{max}$ (step S112; No), moving to step S114 without passing through step S113.

Then, step S102 to step S114 are repeated until n becomes larger than N, in other words, in all of the coding rates (step S115; Yes) and $R_{max}(k)$ and $Q_{max}(k)$ at a terminating stage becomes the MCS to be selected.

Figure 5:
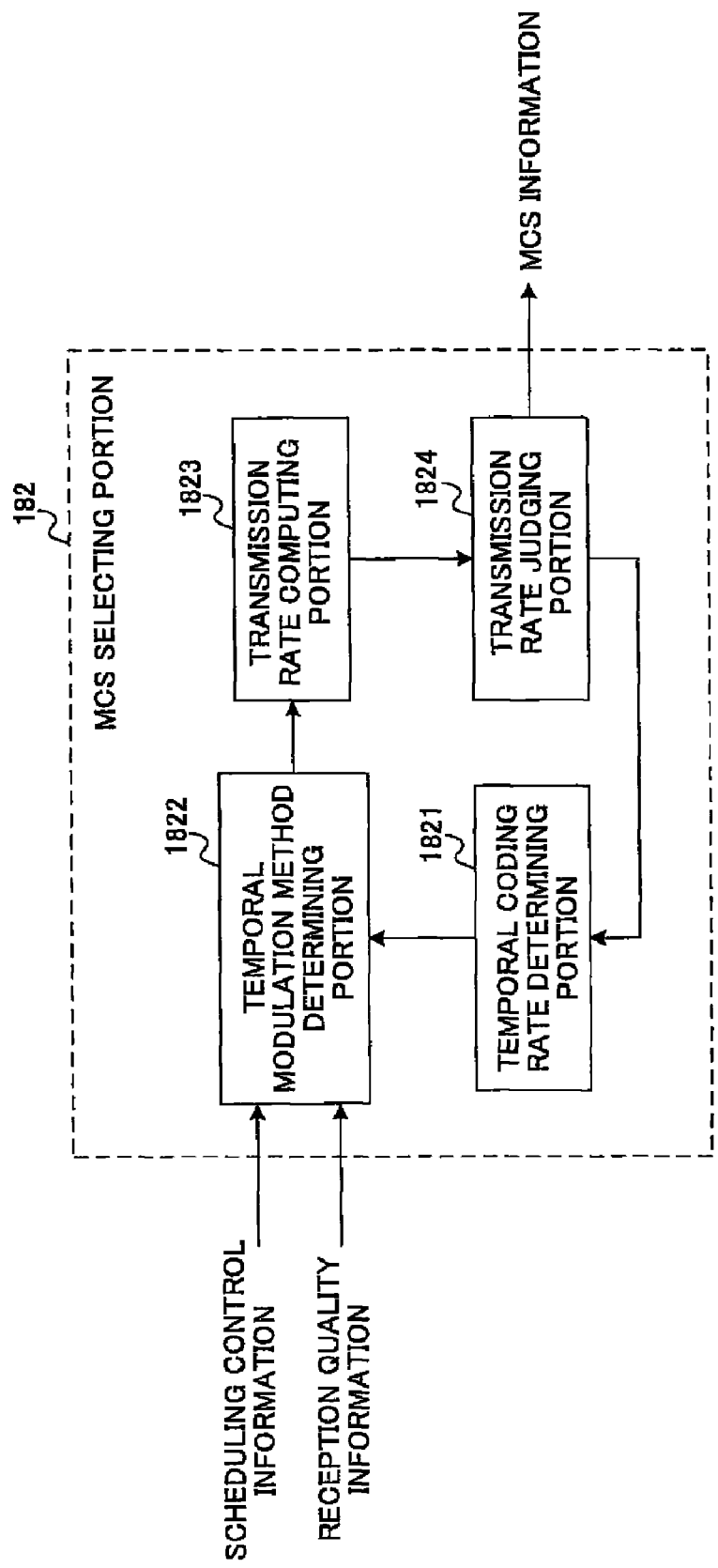
FIG. 5 is a view illustrating a configuration of the MCS selecting portion in the first embodiment.

An example of a block diagram of the MCS selecting portion 182 that realizes the above processing is shown in FIG. 5. The MCS selecting portion 182 is configured so as to comprise a temporal coding rate determining portion 1821, a temporal modulation method determining portion 1822, a transmission rate computing portion 1823, and a transmission rate determining portion 1824.

In the temporal coding rate determining portion 1821, one coding rate is selected in advance among selectable coding rates and determined as a temporal coding rate, to notify to the temporal modulation method determining portion 1822. In the temporal modulation method determining portion 1822, under the temporal coding rate determined by the temporal coding rate determining portion 1821, from scheduling control information including information indicative of the allocated channels and reception quality information including information indicative of reception quality in each of the allocated channels, a modulation method with the maximum rate that satisfies the required quality is determined in each of the allocated channels.

The temporal coding rate and the temporal modulation method in each of the allocated channels are output to the transmission rate computing portion 1823 to calculate the maximum transmission rate under the temporal coding rate. The maximum transmission rate under the temporal coding rate and the temporal modulation method in the temporal coding rate and each of the allocated channels are output to the transmission rate judging portion 1824. When the above processing is not finished for all of the coding rates, the transmission rate judging portion 1824 requires the temporal coding rate determining portion 1821 to set another temporal coding rate. Further, when the above processing is finished for all of the coding rates, the maximum transmission rates in each of the terminal coding rates are compared to output MCS information including the coding rate in which the transmission rate is maximum and the modulation method in each of the allocated channels.

As described above, according to the present embodiment, it is possible to select a combination so that the transmission rate becomes maximum under the conditions that the required quality is satisfied in all of the allocated channels. Accordingly, it is possible to perform efficient communication while satisfying the required quality.

The Second Embodiment

In the first embodiment, a method of selecting an optimum MCS by investigating in a round-robin method a combination in which a transmission rate becomes maximum under the conditions that the required quality is satisfied, has been described. In the present embodiment, a method of selecting an optimum MCS more efficiently by sorting reception quality and modulation multi-value number in each channel beforehand in the descending order, will be described. Although an example of a block configuration of a system according to the present embodiment is same as FIG. 1 to FIG. 3, processing in the MCS selecting portion 182 is different from the first embodiment.

Figure 6:
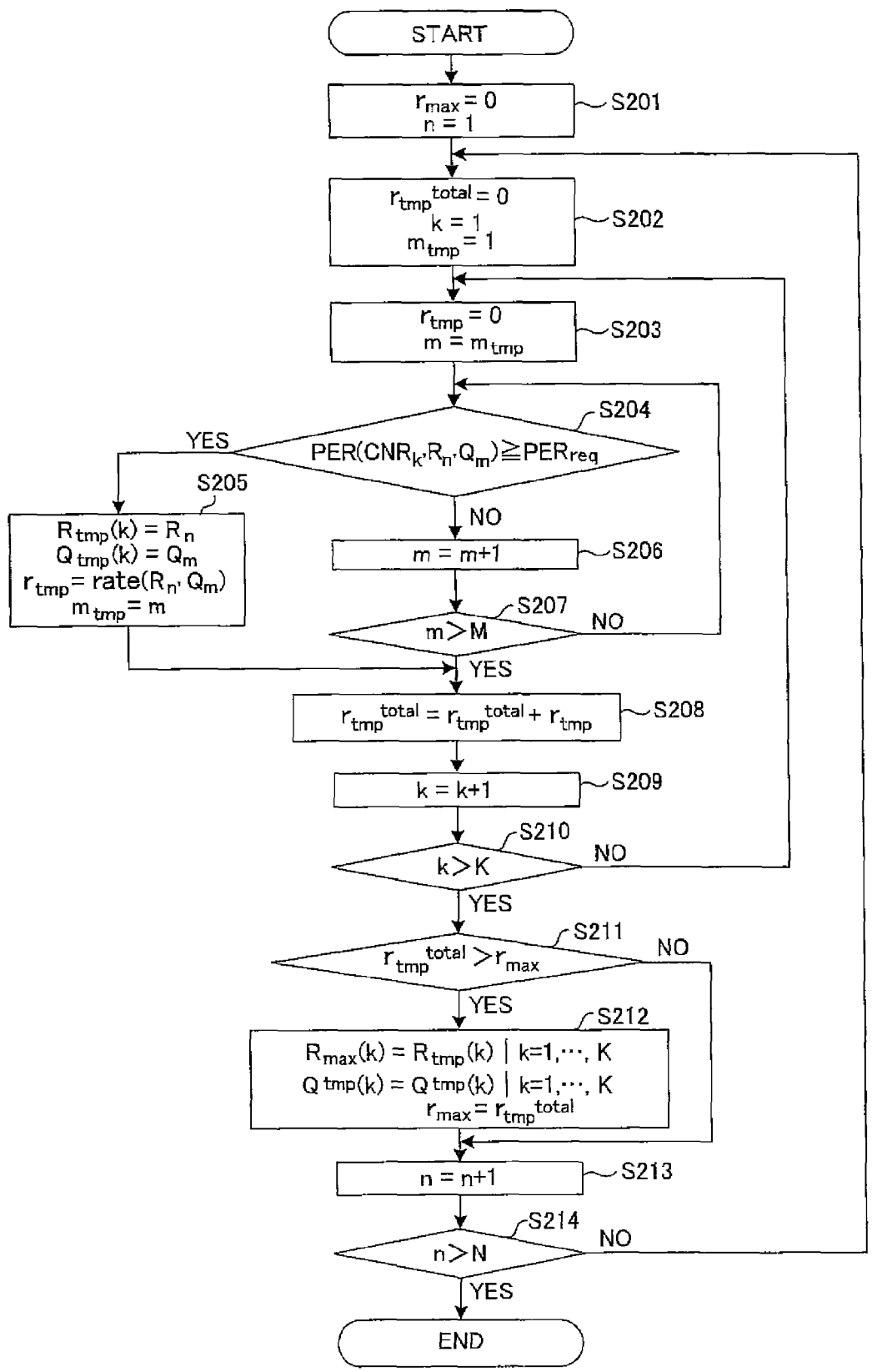
FIG. 6 is a view illustrating a processing flow of an MCS selecting portion in a second embodiment.

FIG. 6 shows a processing flow of MCS selection in the second embodiment. Hereinafter, using FIG. 6, a method of selecting an MCS in the present embodiment will be described focusing on the point different from the first embodiment.

Note that, as described above, it is assumed that the reception quality and the modulation multi-value number in each channel are sorted beforehand in the descending order. In other words, there is a relation of $CNR_1 \geq CNR_2 \geq \ldots \geq CNR_K$, $Q_1 \geq Q_2 \geq \ldots \geq Q_M$.

First, in the first embodiment, it is calculated that whether a required PER is satisfied for all modulation methods, or whether a transmission rate is maximum, at step S103 to step S108. On the other hand, in the processing of selecting an MCS in the present embodiment, only judgment as to whether the required PER is satisfied is performed while repeating step S203 to step S207, and when the required PER is satisfied, the repeat is interrupted to move to a next step. This is because it is obvious that the transmission rate is reduced every time the repeat is continued since the modulation multi-value number is sorted in the descending order beforehand with respect to the counter m. Thereby, it is possible to suppress the computing amount of the repeat part (step S103 to step S108) in the modulation method, compared with the first embodiment.

Second, in the first embodiment, the counter m indicative of the modulation method number was initialized to "1" at step S103. On the other hand, in the present embodiment, m is set at $m_{tmp}$ at step S203. Here, in the repeat processing from step S203 to S210, $m_{tmp}$ is set at "1" at the time of first processing and it is set to be the modulation method number which attains a maximum rate in the previous subject channel in the second and proceeding processing.

For example, in a case where M is three selectable kinds of 64QAM, 16QAM, and QPSK as the modulation method, when a modulation method with a maximum transmission rate in the k-th channel is 16QAM, the modulation methods selectable in the (k+1)th channel are 16QAM and QPSK. This is because it is obvious that in a case where the coding rate is fixed, if the required quality is not satisfied when 64QAM is applied to the k-th channel in the k-th channel and (k+1)th channel, that have a relation of $CNR_k \geq CNR_{K+1}$, the required quality is not also satisfied when 64QAM is applied to the (k+1)th channel.

Figure 7:
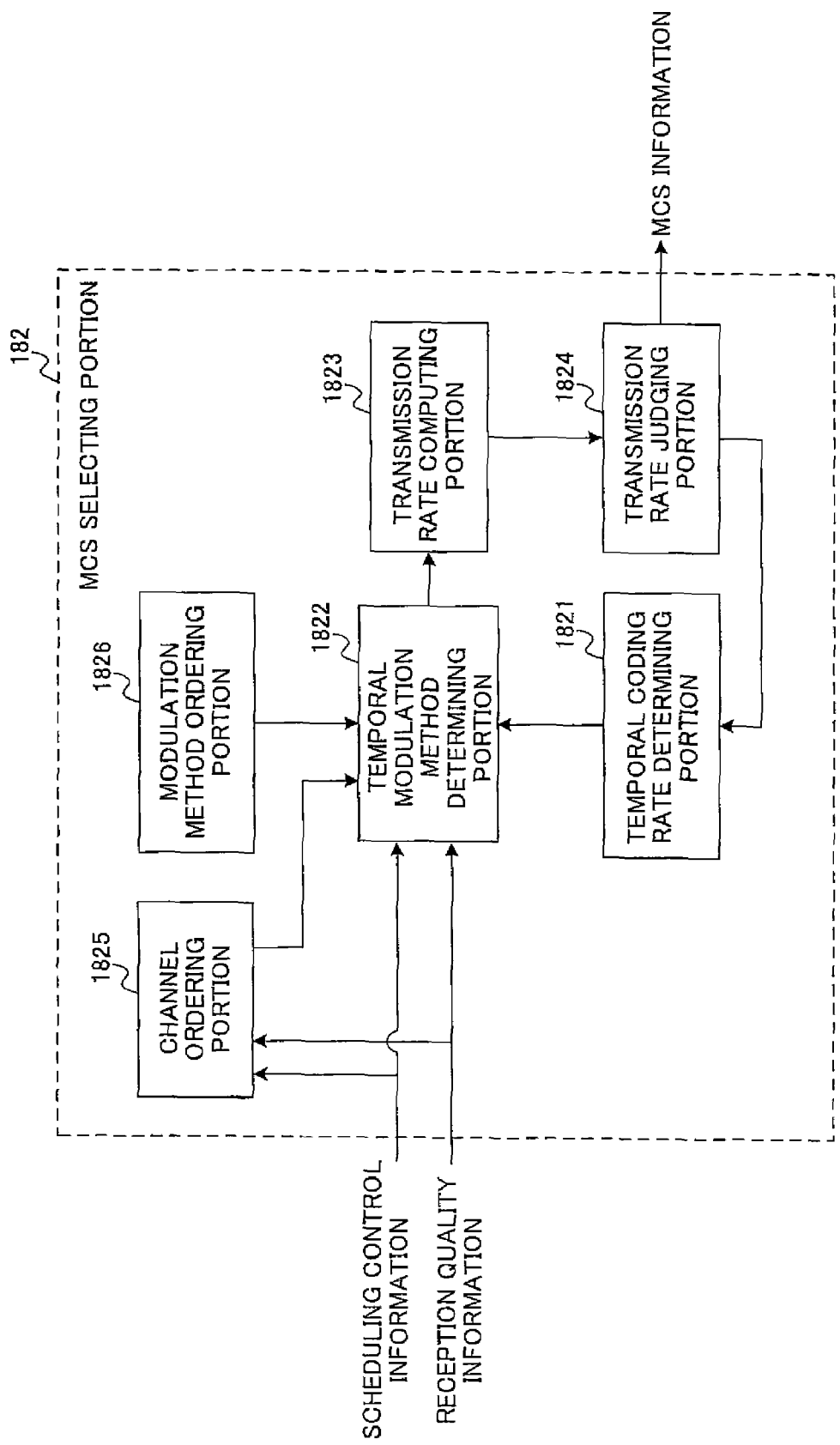
FIG. 7 is a view illustrating a configuration of the MCS selecting portion in the second embodiment.

An example of a block diagram of the MCS selecting portion 182 that realizes the above processing is shown in FIG. 7. The MCS selecting section 182 is configured so as to comprise a channel ordering portion 1825 and a modulation method ordering portion 1826, in addition to the temporal coding rate determining portion 1821, the temporal modulation method determining portion 1822, the transmission rate computing portion 1823, and the transmission rate judging portion 1824, that are shown in FIG. 5.

In the channel ordering portion 1825, channels are ordered depending on reception quality, from scheduling control information including information indicative of allocated channels and reception quality information including information indicative of reception quality in each of the allocated channels.

In the modulation method ordering portion 1826, selectable modulation methods are ordered by multi-value number thereof. Alternatively, the selectable modulation methods that are ordered by the multi-value number are stored.

In the temporal modulation method determining portion 1822, when a modulation method with a maximum rate that satisfies required quality is determined in each of the allocated channels from the scheduling control information and the reception quality information, under the temporal coding rate determined by the temporal coding rate determining portion 1821, computation is performed in the order of the channels ordered in the channel ordering portion 1825 and the order of the modulation methods ordered in the modulation method ordering portion 1826.

As described above, according to the second embodiment, although the computing amount required for the sorting is increased by sorting reception quality and the modulation multi-value number in each of the channels beforehand, it is possible to select efficiently a combination in which the transmission rate becomes maximum under the conditions that the required quality is satisfied, in all of the allocated channels.

Note that, in the above second embodiment, although it has been described assuming that the reception quality and the modulation multi-value number are sorted beforehand in the descending order, similar effect can be obtained when the reception quality and the modulation multi-value number are sorted in the ascending order.

The Third Embodiment

Subsequently, the third embodiment will be described. In the first embodiment and the second embodiment, a method of selecting an optimum MCS by investigating a combination in which a transmission rate becomes maximum under the conditions that required quality is satisfied in all coding rates, has been described. In the present embodiment, a method of selecting an optimum MCS more efficiently by restricting in advance a coding rate so that required quality is satisfied in a channel that includes predetermined conditions of reception quality, will be described. Note that, in the present embodiment, a case that a channel with a minimum value is selected from each of the channels as the conditions of the reception quality in the channels, will be described as an example.

Figure 8:
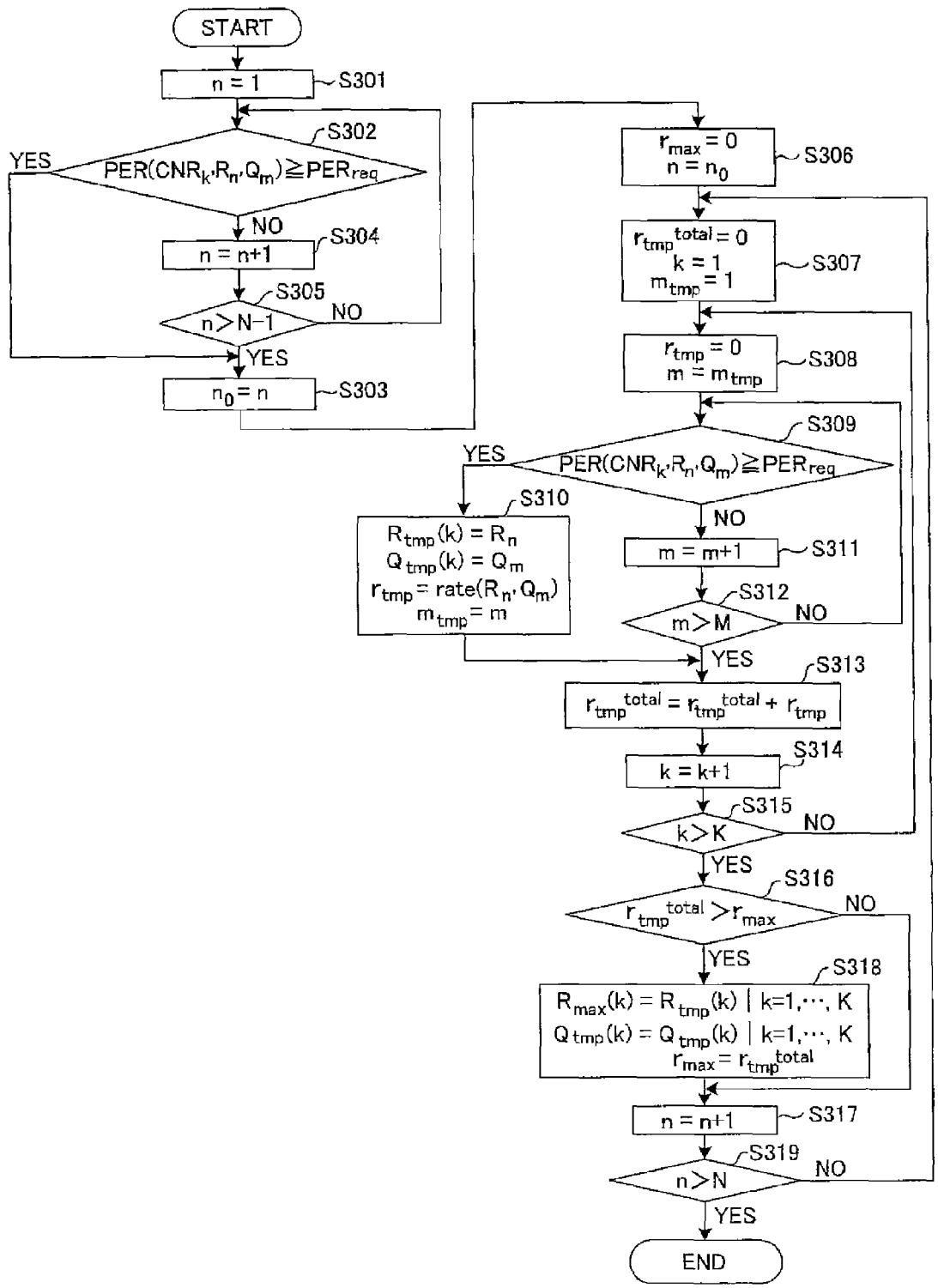
FIG. 8 is a view illustrating a processing flow of an MCS selecting portion in a third embodiment.

Although an example of a block configuration of a system according to the present embodiment is same as FIG. 1 to FIG. 3, processing in the MCS selecting portion 182 is different from the first embodiment or the second embodiment. FIG. 8 shows a processing flow of the MCS selection according to the third embodiment, and a method of selecting an MCS in the present embodiment will be described focusing on the point different from the first embodiment.

Steps of restricting a coding rate in advance so that the required quality is satisfied in a channel having a minimum value in the reception quality (step S301 to step S303) will be described. Note that, it is assumed that coding rates, reception quality in each channel, and modulation multi-value number are sorted beforehand in the descending order. In other words, there is a relation of $R_1 \geq R_2 \geq \ldots \geq R_N$, $CNR_1 \geq CNR_2 \geq \ldots \geq CNR_K$, and $Q_1 \geq Q_2 \geq \ldots \geq Q_M$.

First, the counter n indicative of a number of a coding rate is initialized (step S301). Next, in the channel having the minimum value in the reception quality, when the modulation method $Q_M$ with the minimum transmission rate is selected in the reception quality value $CNR_K$, whether or not the required quality is satisfied in the coding rate $R_n$ is judged (step S302). When the required quality is satisfied in the coding rate $R_n$ (step S302; Yes), the counter n is set at the variable $n_0$ indicative of a maximum number of the coding rate in the investigation range. When the required quality is not satisfied in the coding rate $R_n$ (step S302; No), the variable n is incremented so that the low coding rate is targeted (step S304), and the same judgment is performed while the variable n is not more than N−1 (step S305; No to Step S302). In addition, when the variable n becomes larger than N−1 (step S305; Yes), n is set at $n_0$ as the minimum coding rate (step S303).

That is, at step S301 to step S303, the coding rate having the maximum rate that satisfies the required quality is determined in a case where the modulation method of the minimum rate is selected in the channel having the minimum value in the reception quality, and the number indicative of the coding rate is set at $n_0$.

Figure 9:
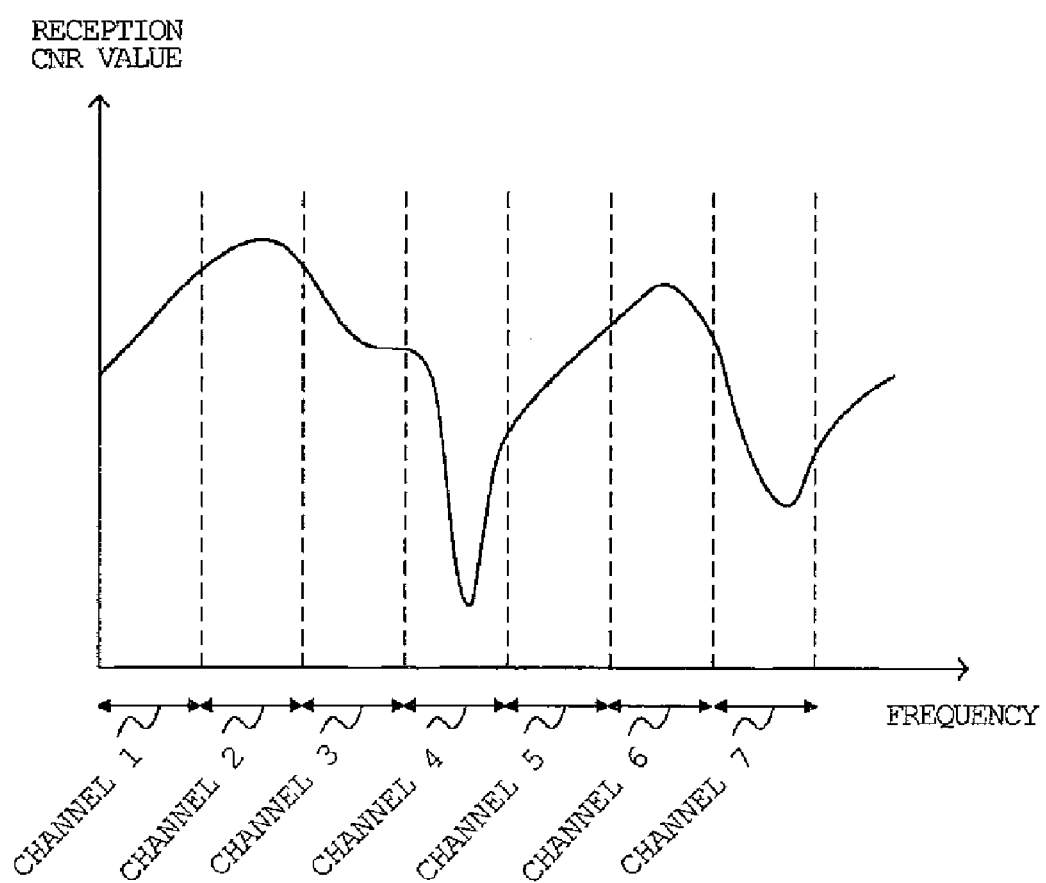
FIG. 9 is a view illustrating a relation between a reception CNR value and a frequency.
Figure 10:
FIG. 10 is a view illustrating a relation between a reception CNR value and a frequency.

Here, for example, it is considered that when a relation between a frequency (channel) and a reception CNR value is in a state shown in a graph of FIG. 9 and a table of FIG. 10. In this case, from the graph of FIG. 9 and the table of FIG. 10, the reception quality is the lowest in a channel 4. Here, when three kinds of modulation methods including 64QAM, 16QAM, and QPSK are selectable as a modulation method, QPSK that is a modulation method having the minimum transmission rate is selected. In this case, it is assumed that the required quality is satisfied and the coding rate having the maximum transmission rate is ⅓. At this time, if the coding rate is set so as to be larger than ⅓, the required quality can not be satisfied in this channel for any modulation methods. That is, the investigation range of coding rates can be narrowed down to ⅓ or less.

Next, an initial value of the counter n indicative of the number of the coding rate is set at $n_0$, and repeat processing from step S307 to step S319 is performed for n that is larger than $n_0$, and thereby the amount of the repeat processing can be suppressed. In FIG. 8, as the repeat processing from step S307 to step S319, although a case that the similar processing as the processing shown in FIG. 6 is performed is shown, the processing same as FIG. 4 may be performed.

Figure 11:
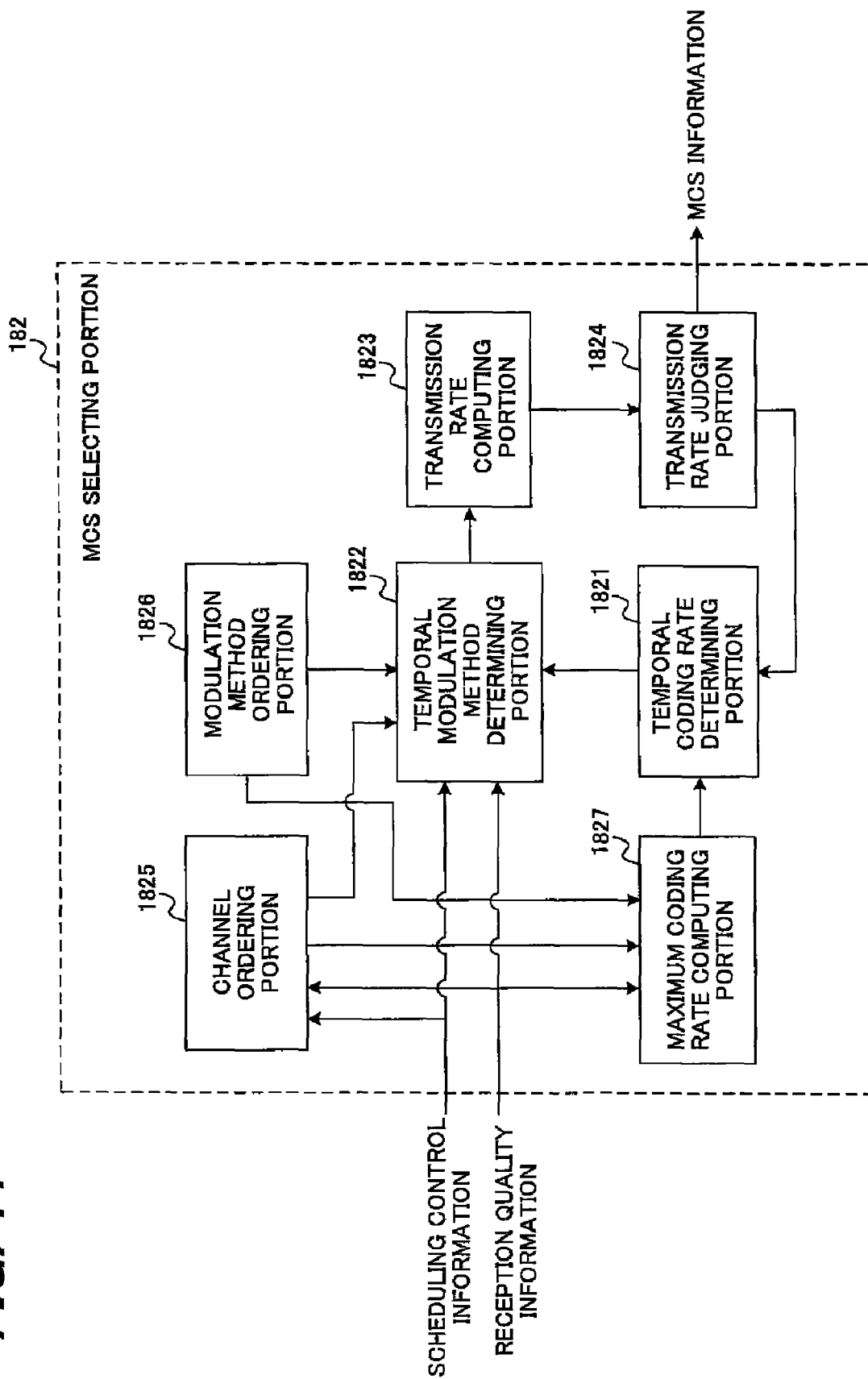
FIG. 11 is a view illustrating a configuration of the MCS selecting portion in the third embodiment.

An example of a block diagram of the MCS selecting portion 182 that realizes the above processing is shown in FIG. 11. The MCS selecting portion 182 is configured so as to comprise a maximum coding rate computing portion 1827, in addition to the temporal coding rate determining portion 1821, the temporal modulation method determining portion 1822, the transmission rate computing portion 1823, the transmission rate judging portion 1824, the channel ordering portion 1825, and the modulation method ordering portion 1826, that are shown in FIG. 7.

In the maximum coding rate computing portion 1827, when a modulation method having a minimum rate notified from the modulation method ordering portion is applied in a channel, that has the lowest reception quality, notified from the channel ordering portion 1825, a coding rate having a maximum rate that satisfies the reception quality is computed to notify to the temporal coding rate determining portion 1821.

In the temporal coding rate determining portion 1821, a coding rate that is not more than the coding rate notified from the maximum coding rate computing portion 1827 is determined as a temporal coding rate.

Note that, in FIG. 11, although it is configured so that the channel having the lowest reception quality and the modulation method having the minimum rate are notified, respectively from the channel ordering portion 1825 and the modulation method ordering portion 1826 to the maximum coding rate computing portion 1827, it may be replaced with another block in which the channel having the lowest reception quality and the modulation method having the minimum rate are extracted.

As described above, according to the present embodiment, the coding rate is restricted in advance so that the required quality is satisfied in the channel having the lowest value in the reception quality. Thereby, although the computing amount required for restricting the coding rate is increased, it is possible to efficiently select a combination, in which the transmission rate is maximum under the conditions that the required quality is satisfied, in all of the allocated channels.

Note that, although an example of using a CNR as the reception quality informed from the second radio device 200 is assumed in any of the above embodiments, information of the reception quality is not limited thereto. For example, other information related to reception power, including a CIR (Carrier-to-Interface power Ratio), a SNR (Signal-to-Noise power Ratio), an $Es/N_0$ (energy to noise power density ratio per a symbol), and an RSSI (Receive Signal Strength Indication), can be used, and information related to a transmission rate, including an MCS with a maximum rate that satisfies the required quality, and a maximum number of information bits per a frame that satisfies the required quality, can be also used.

Further, in all of the embodiments, a PER is assumed as the required value, but not limited thereto. Other parameters including parameters related to the reception success such as a BER (Bit Error Rate) and a BLER (Block Error Rate) can be used, as long as it is a parameter indicative of communication quality.

Furthermore, although the description has been made assuming that the reception quality and the modulation multi-value number are sorted in the descending order beforehand also in the above third embodiment, similar effect can be obtained as well when the reception quality and the modulation multi-value number are sorted in the ascending order.

The Fourth Embodiment

Subsequently, the fourth embodiment will be described. The fourth embodiment describes a case that the second radio device 200 selects an MCS using the present invention in a system in which the second radio device 200 informs the first radio device 100 of a receivable MOS as reception quality information.

Figure 12:
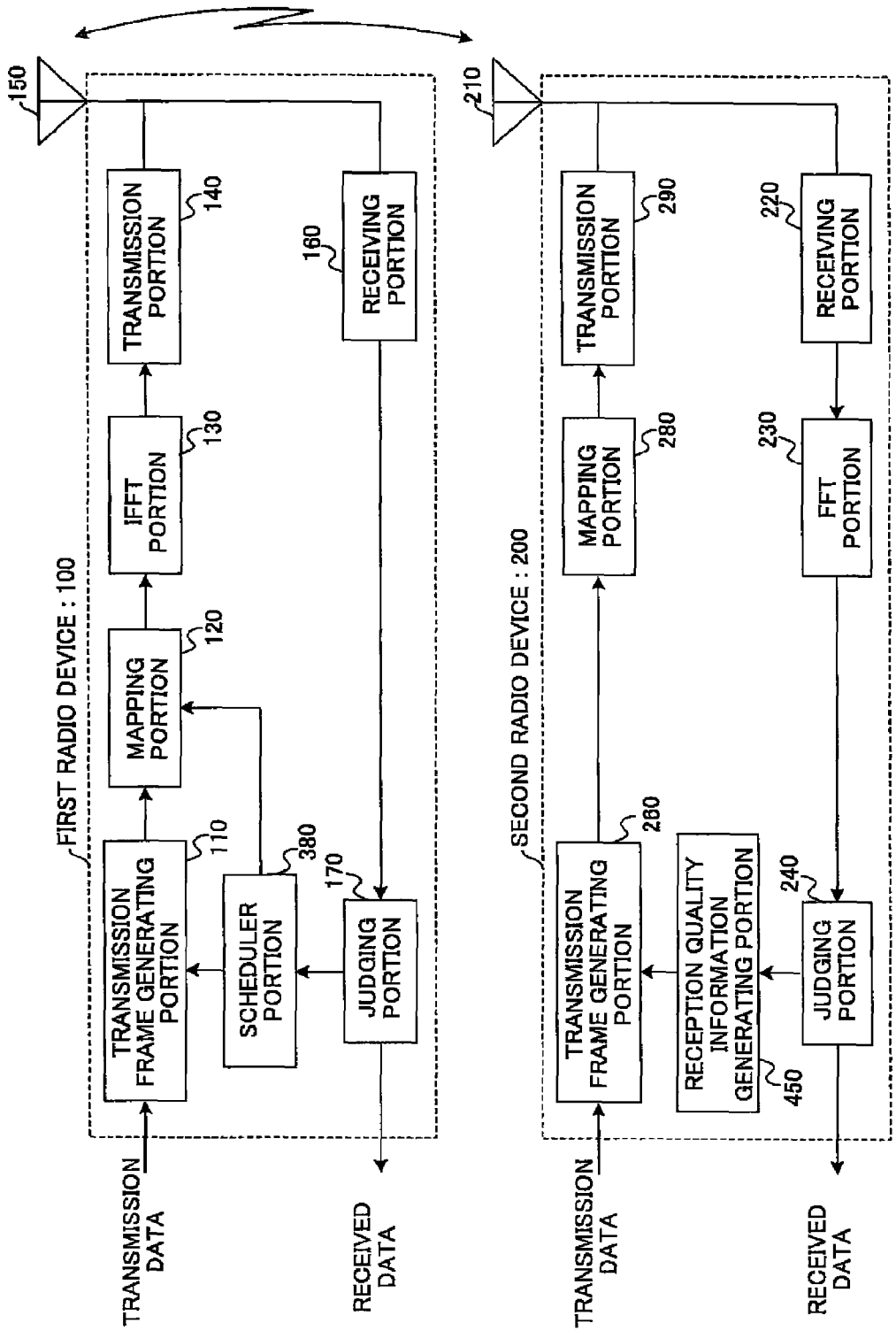
FIG. 12 is a view illustrating a configuration of a radio device in a fourth embodiment.

An example of a block configuration of a system according to the present embodiment is shown in FIG. 12. Although FIG. 12 has the same configuration as FIG. 1, processing in a scheduler portion 380 in the first radio device 100 and a reception quality information generating portion 450 in the second radio device 200.

Figure 13:
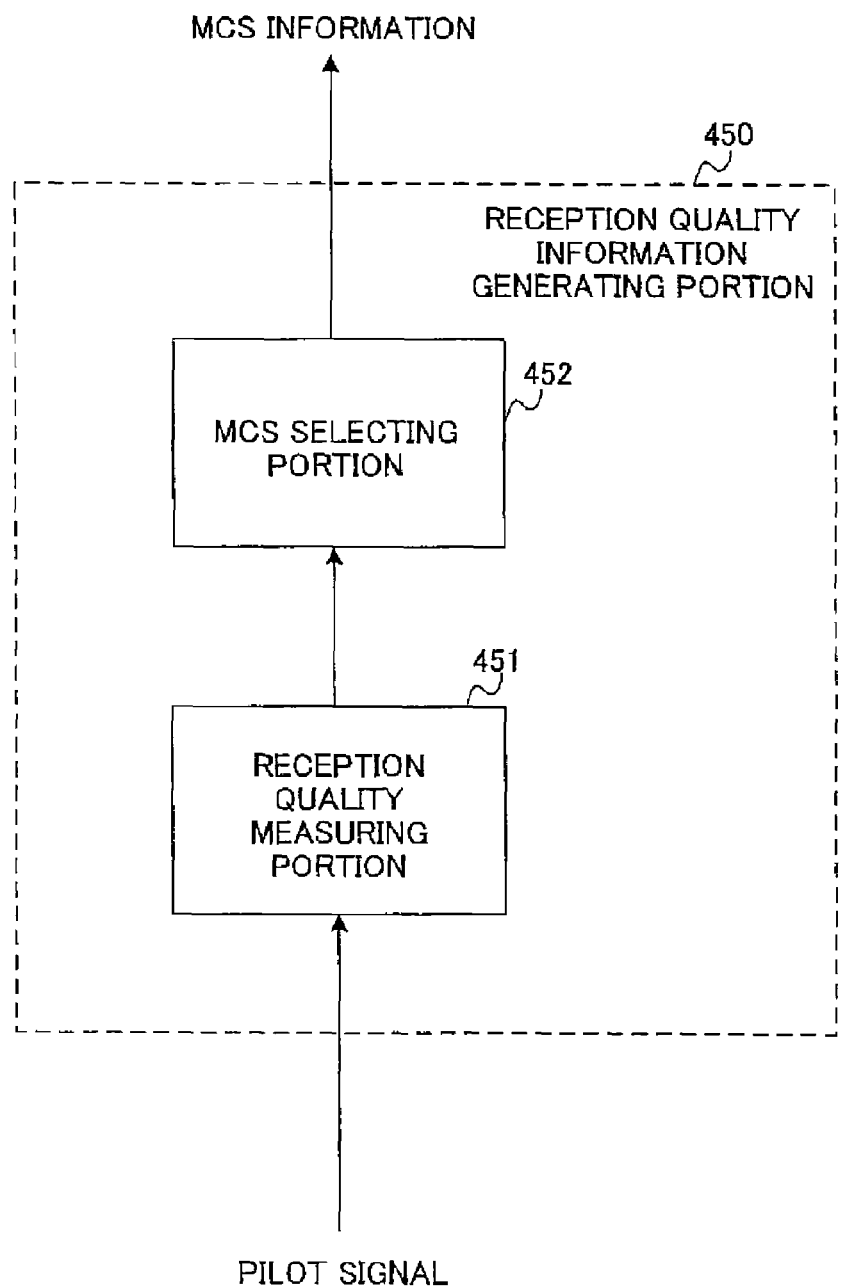
FIG. 13 is a view illustrating a configuration of a reception quality information generating portion in the fourth embodiment.

A block configuration of the reception quality information generating portion 380 is shown in FIG. 13. A pilot signal separated at a judging portion is transmitted to the reception quality measuring portion 451, and reception quality of each channel is measured at the reception quality measuring portion 451. The measurement result of the reception quality in each of the channels is transmitted to an MCS selecting portion 452. At the MCS selecting portion 452, an MCS in each of the channels is selected from the measurement result of the reception quality in each of the channels, and MCS information indicative of the selected MCS is notified to the transmission frame 260. At this time, in the MCS selecting portion 452, the same selecting method as described in the first embodiment to the third embodiment can be used. In addition, when an MCS is selected in the second radio device 200, a career hole may be set as one of MCS levels. That is, in a certain channel, when the required quality can not be satisfied even when a combination of a coding rate and a modulation method with a minimum transmission rate is selected, a carrier hole is to be selected as the MCS of the channel. When the channel to be the carrier hole exists, the same selecting method as described in the first embodiment to the third embodiment is used for channels except for the channel.

The transmission frame generating portion 260 multiplexes a control signal to transmission data in order to inform the first radio device 100 of the MCS information notified from the reception quality information generating portion 380.

Figure 14:
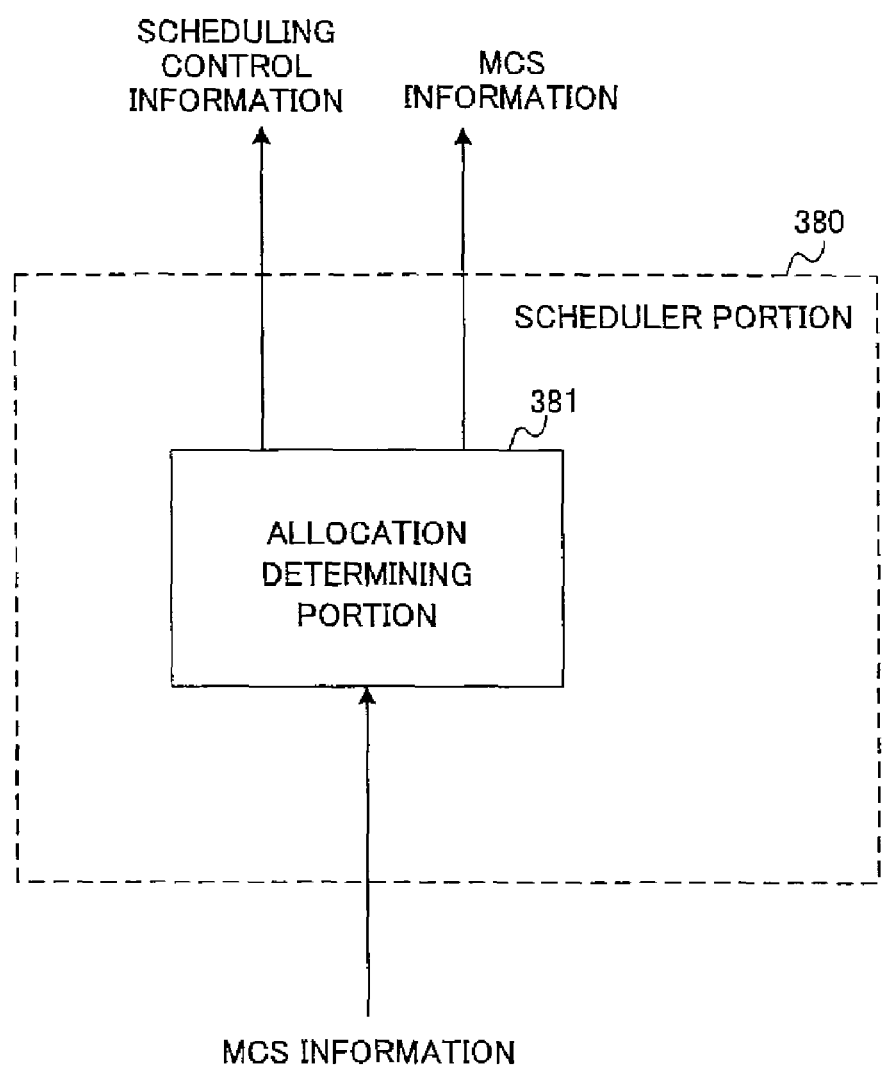
FIG. 14 is a view illustrating a configuration of a scheduler portion in the fourth embodiment.

A block configuration of the scheduler portion 380 is shown in FIG. 14. The MCS information informed from each of the second radio devices 200 is transmitted to an allocation determining portion 381 to compare with an MCS in each of the channels. The channel is allocated to transmission data to be transmitted to the second radio devices 200 having a large transmission rate in each of the channels. The MCS of the allocated transmission data is adapted to be an MCS informed from the second radio device 200 that is a transmission destination of the transmission data. Scheduling information determined at the allocation determining portion 381 is transmitted to the transmission frame generating portion 110 together with the MCS information of the allocated transmission data. In addition, the scheduling control information is also output to the mapping portion 120.

As described above, also in a system in which an MCS having a maximum rate that satisfies the required quality is selected in the second radio device 200 to inform to the first radio device 100, it is possible to select an MCS efficiently by using the present invention.

What is claimed is:

1. A modulation parameter selecting method related to a modulation method and a coding rate, in a system which allows, with respect to data allocated over a plurality of channels by performing data transmission using the plurality of channels from a first communication apparatus to a second communication apparatus, that the coding rate is same and only the modulation method is different in the plurality of channels to which the data has been allocated, comprising:
    a first step of selecting and temporarily determining one coding rate from predetermined selectable coding rates;
    a second step of selecting a modulation method that satisfies required quality and has a predetermined transmission rate in each of the channels, under the temporarily determined coding rate;
    a third step of calculating a transmission rate from the coding rate temporarily determined at the first step and the modulation method in each of the channels selected at the second step; and
    a fourth step of repeating from the first step to the third step with respect to other selectable coding rates to determine the coding rate that has the predetermined transmission rate and the modulation method in each of the channels,
    wherein before the second step, a fifth step of ordering each of the channels based on reception quality, and a sixth step of ordering selectable modulation methods by modulation multi-value number, and
    wherein the modulation method is selected at the second step in accordance with an order of the channels determined at the fifth step and an order of the modulation methods determined at the sixth step.

2. The modulation parameter selecting method according to claim 1, further comprising: before the first step, a seventh step of changing the selectable coding rate from the reception quality in a channel whose predetermined conditions include the reception quality, wherein the temporal coding rate is determined at the first step from the selectable coding rates determined at the seventh step.

3. The modulation parameter selecting method according to claim 1, further comprising: before the first step, an eighth step of determining a selectable modulation method with a minimum transmission rate temporarily in a channel that has a most inferior reception quality, a ninth step of determining a coding rate in which the channel satisfies the required quality and the transmission rate becomes maximum, under the modulation method temporarily determined at the eighth step, and a tenth step of changing the selectable coding rates based on the coding rate determined at the ninth step, wherein the temporal coding rate is determined at the first step from the selectable coding rates determined at the tenth step.

4. The modulation parameter selecting method according to claim 1, further comprising: before the first step, an eighth step of determining a selectable modulation method with a minimum transmission rate temporarily in a channel that has a most inferior reception quality in the channels that satisfy predetermined reception quality, a ninth step of determining a coding rate in which the channel satisfies the required quality and the transmission rate becomes maximum, under the modulation method temporarily determined at the eighth step, and a tenth step changing the selectable coding rates based on the coding rate determined at the ninth step, wherein the temporal coding rate is determined at the first step from the selectable coding rates determined at the tenth step, and a channel that does not satisfy the predetermined reception quality is determined as a carrier hole.

5. A modulation parameter selecting apparatus related to a modulation method and a coding rate, in a system which allows, with respect to data allocated over a plurality of channels by performing data transmission using the plurality of channels from a first communication apparatus to a second communication apparatus, that the coding rate is same and only the modulation method is different in the plurality of channels to which the data has been allocated, comprising:
 a temporal coding rate determining portion that selects and temporarily determines one coding rate from predetermined selectable coding rates;
 a temporal modulation method determining portion that selects a modulation method that satisfies required quality and has a predetermined transmission rate in each of the channels, under the temporarily determined coding rate;
 a transmission rate computing portion that calculates a transmission rate from the coding rate temporarily determined at the temporal coding rate determining portion and the modulation method in each of the channels selected at the temporal modulation method determining portion;
 a channel ordering portion that orders each of the channels based on reception quality; and
 a modulation method ordering portion that orders selectable modulation methods by modulation multi-value number,
 wherein processing from the temporal coding rate determining portion to the transmission rate computing portion is performed repeatedly with respect to other selectable coding rates, to determine the coding rate that has the predetermined transmission rate and the modulation method in each of the channels, and
 wherein the modulation method is selected at the temporal modulation method determining portion in accordance with an order of the channels determined at the channel ordering portion and an order of the modulation methods determined at the modulation method ordering portion.

6. The parameter selecting apparatus according to claim 5, further comprising: a coding rate computing portion that changes the selectable coding rate from the reception quality in a channel whose predetermined conditions include the reception quality, wherein
 the temporal coding rate is determined at the temporal coding rate determining portion from the selectable coding rates determined at the coding rate computing portion.

7. The parameter selecting apparatus according to claim 5, further comprising: a maximum coding rate computing portion that changes the selectable coding rates based on a coding rate in which a channel satisfies the required quality and a transmission rate is maximum, under the selectable modulation method that has a minimum transmission rate in the channel that has most inferior reception quality, wherein
 the temporal coding rate is determined at the temporal coding rate determining portion from the selectable coding rates changed at the maximum coding rate computing portion.

8. The parameter selecting apparatus according to claim 5, further comprising: a maximum coding rate computing portion that changes the selectable coding rates based on a coding rate in which a channel satisfies the required quality and a transmission rate is maximum, under the selectable modulation method that has a minimum transmission rate in the channel that has most inferior reception quality in the channels that satisfy predetermined reception quality, wherein the temporal coding rate is determined at the temporal coding rate determining portion from the selectable coding rates changed at the maximum coding rate computing portion, and
 a channel that does not satisfy the predetermined reception quality is determined as a carrier hole.

9. A communication apparatus, comprising the modulation parameter selecting apparatus according to claim 5, wherein information related to a modulation parameter selected by the modulation parameter selecting apparatus is transmitted to a communication partner.

* * * * *